(12) United States Patent
Kanzawa

(10) Patent No.: US 6,694,620 B2
(45) Date of Patent: Feb. 24, 2004

(54) FOLDING SAW

(75) Inventor: Kuniyuki Kanzawa, Miki (JP)

(73) Assignee: Kanzawa Seiko Co., Ltd., Miki (JP)

( * ) Notice: Subject to any disclaimer, the term of this patent is extended or adjusted under 35 U.S.C. 154(b) by 0 days.

(21) Appl. No.: 10/100,014

(22) Filed: Mar. 19, 2002

(65) Prior Publication Data

US 2002/0133953 A1 Sep. 26, 2002

(51) Int. Cl.[7] .......................... B27B 21/00; B27G 19/00
(52) U.S. Cl. .......................... 30/161; 30/166.3; 30/504; 30/517
(58) Field of Search .......................... 30/143, 144, 151, 30/153, 166.3, 161, 355, 504, 517, 519

(56) References Cited

U.S. PATENT DOCUMENTS

| | | | | |
|---|---|---|---|---|
| 1,638,749 A | * | 8/1927 | Santoyo | 30/161 |
| 6,253,455 B1 | * | 7/2001 | Eriksson et al. | 30/504 |
| 6,463,663 B1 | * | 10/2002 | Kanzawa | 30/160 |

FOREIGN PATENT DOCUMENTS

| | | | |
|---|---|---|---|
| EP | 1 243 369 A1 | * | 9/2002 |
| JP | 10-291202 | * | 11/1998 |
| JP | 2001-158001 | | 6/2001 |
| JP | 2002/96303 | * | 4/2002 |

* cited by examiner

*Primary Examiner*—Hwei-Siu Payer
(74) *Attorney, Agent, or Firm*—Armstrong, Kratz, Quintos, Hanson & Brooks

(57) ABSTRACT

A protective cover (4) for a folding saw in which the edge (1a) of the blade (1) can be nestled in place inside the housing groove (3) of the handle (2) having a semi-U-shaped cross section for housing the blade (1) in such a way that it is pivotally movable around the top end of the handle. A pivotal control lever (5) disposed at the bottom end of the handle (2) has a portion engaged with the tip of the protective cover (4). The protective cover (4) can be inserted into, and retracted from, the housing groove (3) of the handle (2) by the pivotal operation of the control lever (5). In this way, the protective cover (4) covers the edge (1a) of the blade (1) that is exposed from the housing groove (3).

3 Claims, 7 Drawing Sheets

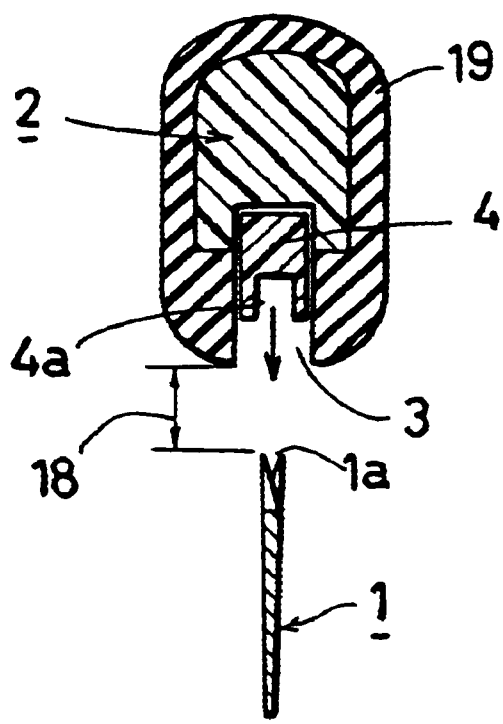
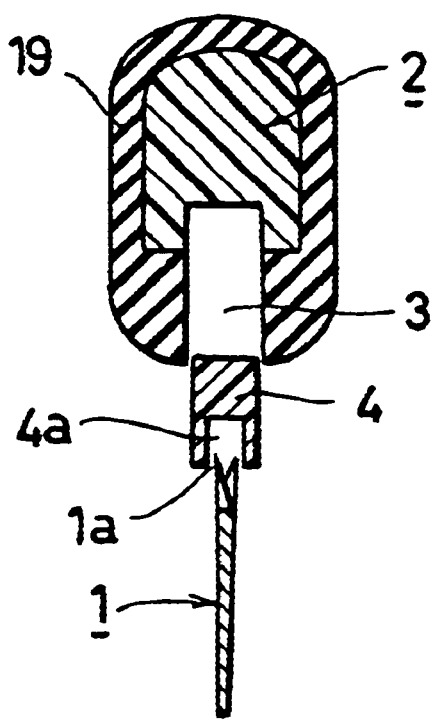
FIG.8(a)  FIG.8(b)
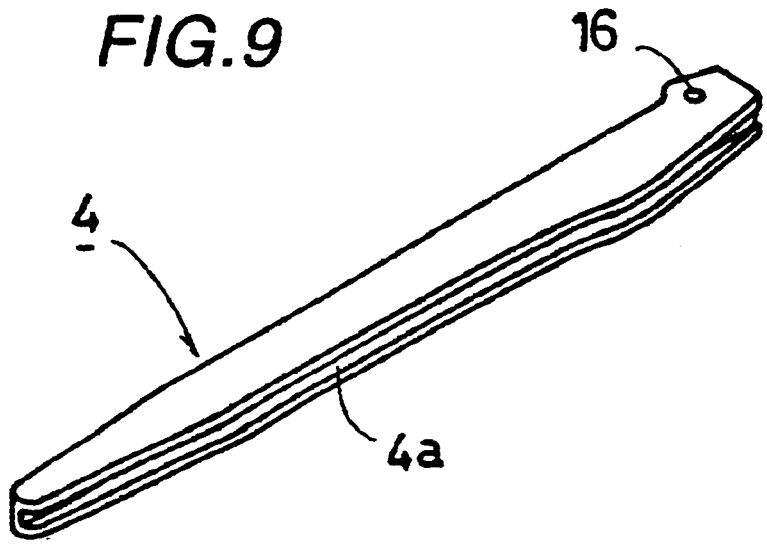
FIG.9

FOLDING SAW

TECHNICAL FIELD

A saw, in which the blade is pivotally attached by its base end to the top end of a handle having a U-shaped cross section and capable of being pivoted to be folded into the handle when not in use, is in widespread use as a pruning saw, a gardening saw or as a crafting saw. The present invention related to a hand saw that can be folded into a handle, as explained above (hereinafter referred to as a "folding saw").

BACKGROUND OF THE INVENTION

A conventional folding saw has a straight blade pivotally attached by its base end to the top end of a straight handle. When the blade is folded into the handle, the edge is completely housed within the handle. Recently, however, as shown in FIG. 11(a), saws, in particular pruning saws, having a blade A with a concavely curved edge B and a handle C that are pivotally supported by a pivot D, have come into widespread use. Such saws having a concavely curved blade edge are generally called curved saws. A curved saw is less likely to disengage from the object to be cut, and is therefore capable of cutting the object without fail.

Accordingly, a folding saw having a blade A with a concavely curved edge B housed in a handle C, which is also concave in the same direction as the edge B, as shown in FIGS. 11(a) and 11(b), has been developed. Other variations of the folding saw include those having a blade A with a concave edge B and a straight handle. This applicant has previously invented a folding saw featuring a retractable protective cover housed inside the housing groove of the handle C, in which, when the blade A is folded, the protective cover projects out of the handle so as to cover the edge B of the blade exposing from the housing (Japanese Patent Application 2000-110794).

A folding saw combining a concavely curved edge and a straight handle has a mildly curved form when unfolded as shown in FIG. 11(a). When the blade is folded, however, a portion of the edge, in particular, the middle portion of the curved edge, is exposed as shown in FIG. 11(b). The degree of the exposure differs according to the curvature and overall length of the blade. The exposed portion poses a danger because it can injure a finger of the saw handler or damage an object while the folding saw is being carried or stored. The edge B itself can also be damaged by another object that accidentally comes into contact with it. Japanese Patent Application 2000-110794, which describes an invention by this applicant, solves the problems associated with the conventional technique described above by introducing a protective cover that protects the exposed edge part of the blade. The present invention simplifies the construction of the folding knife proposed in the above application and makes it even easier to use.

SUMMARY OF THE INVENTION

To achieve the desired objectives, the present invention introduces a protective cover 4 that can be pulled out or pushed into the housing groove 3 of the handle 2 for housing the blade 1. The protective cover 4 is pivotally movable around the top end of the handle 2. At the bottom end of the handle 2, a control lever 5 is provided. A recess portion 7 of the control lever 5 is engaged with the free end of the protective cover 4. The protective cover 4 can be inserted into, and extracted from, the housing groove 3 of the handle 2 by pivoting the control lever 5. In this way, when the blade is folded, the protective cover 4 housed in the housing groove 3 is pushed out of the housing groove 3 so as to cover the edge 1a of the blade 1 exposed outside the housing groove 3.

The control lever 5 at the bottom end of the handle 2 is pivotably attached to the bottom of the handle inside the housing groove 3 via a pivot 6, which crosses the plane of the blade 1 at a right angle. A portion of the protective cover 4 is held loosely in a recess 7 formed at one end of the control lever 5, and an activating part 5a, which is a portion of the control lever 5, extends from the periphery of the handle. A concave groove 8 is provided at a portion of the control lever 5, and the top end of the blade 1 is inserted into the concave groove 8 when folded.

BRIEF DESCRIPTION OF DRAWINGS

FIG. 8(a) is a cross section view of the middle part of the folding saw in the condition shown in FIG. 2.

FIG. 8(b) is a cross section view of the middle part of the folding saw in the condition shown in FIG. 3.

FIG. 9 is a perspective view of the protective cover.

PREFERRED EMBODIMENT OF THE INVENTION

A preferred embodiment of the present invention will now be described with reference to the accompanying drawings.

Figure 1:
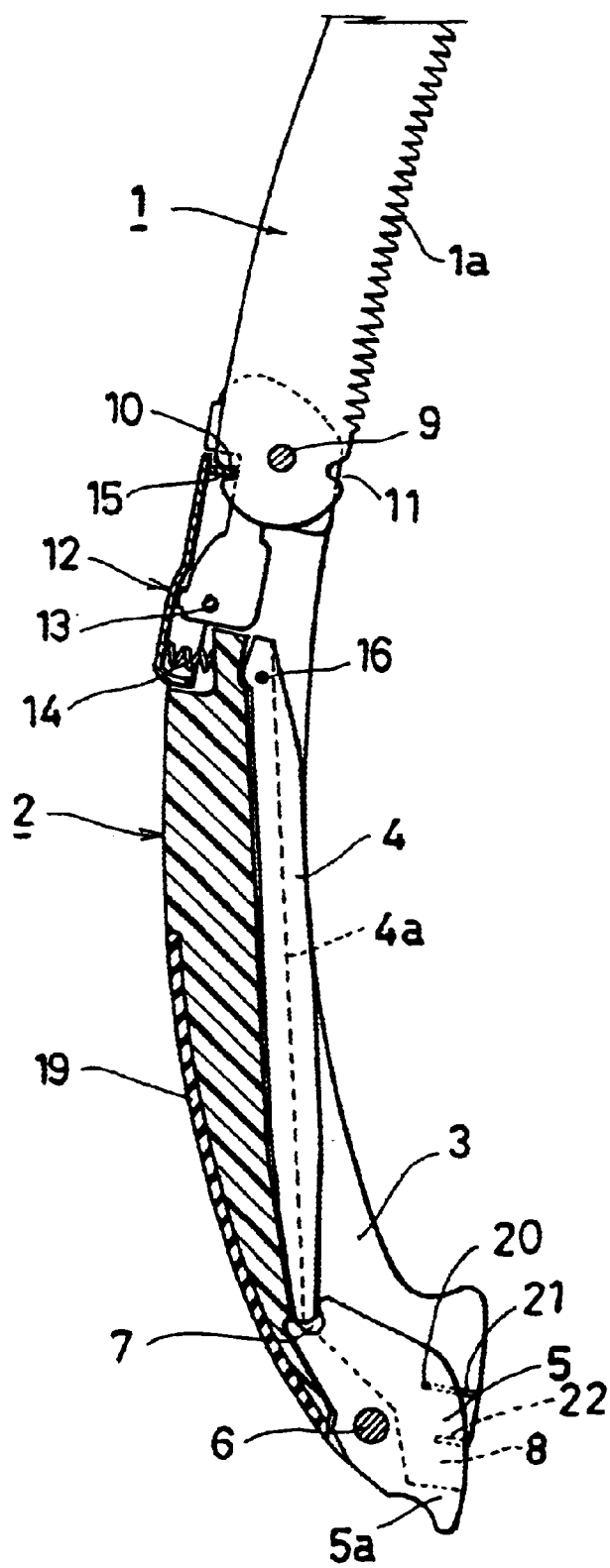
FIG. 1 is a longitudinal section view of a folding saw of the present invention, in which the blade of the saw is unfolded.

In the embodiment shown in FIGS. 1 to 10, a concavely curved blade 1 is pivotally supported by a pivot 9 at the top end of a concavely curved handle 2. When the blade 1 is pivoted and folded, the edge 1a of the blade 1 is housed within the housing groove 3 of the handle 2 having a semi-U-shaped cross section. At the base end of the blade 1, two cuts 10, 11 are formed on the circular arc centered on the pivot 9. A stopper 12 is provided on the handle 2. The stopper 12 engages one or the other of the cuts 10, 11 to hold the blade 1 in a ready-to-cut condition as shown in FIG. 1 and in a folded condition as shown in FIGS. 2 to 5. The stopper 12 is pivotally supported by a pivot 13 and urged by a spring 14 in such a direction that a claw 15 at its tip engages the cut 10 or 11, so that the claw 15 maintains its engagement with the cut 10 or 11. This foldable saw can be carried, stored or otherwise handled with its blade folded.

Inside the housing groove 3 of the handle 2 having a semi-U-shaped cross section, a protective cover 4, itself, having a semi-U-shaped cross section and capable of housing the edge 1a of the blade 1 within its own groove 4a from the open side, is provided as shown in FIG. 8(b). The protective cover 4 pivots about the pivot 16 located at the top end of the handle 2 within the housing groove 3, and can be inserted into, or extracted from, the housing groove 3 of the handle 2. At the bottom end of the handle inside the housing groove 3, a control lever 5 for manually inserting the protective cover 4 into, or extracting it from, the housing groove 3 is provided.

The control lever 5 at the bottom end of the handle 2 is pivotally attached to the bottom end of the handle inside the housing groove 3 via a pivot 6, which crosses the plane of the blade 1 at a right angle. At the top end of the pivotably attached control lever 5, a recess 7, which is depicted as a rounded cut in the drawings, is formed. A portion of the protective cover 4 is held loosely in the recess 7, and an actuating part 5a, which is a portion of the control lever 5, extends from the periphery of the handle.

Figure 10:
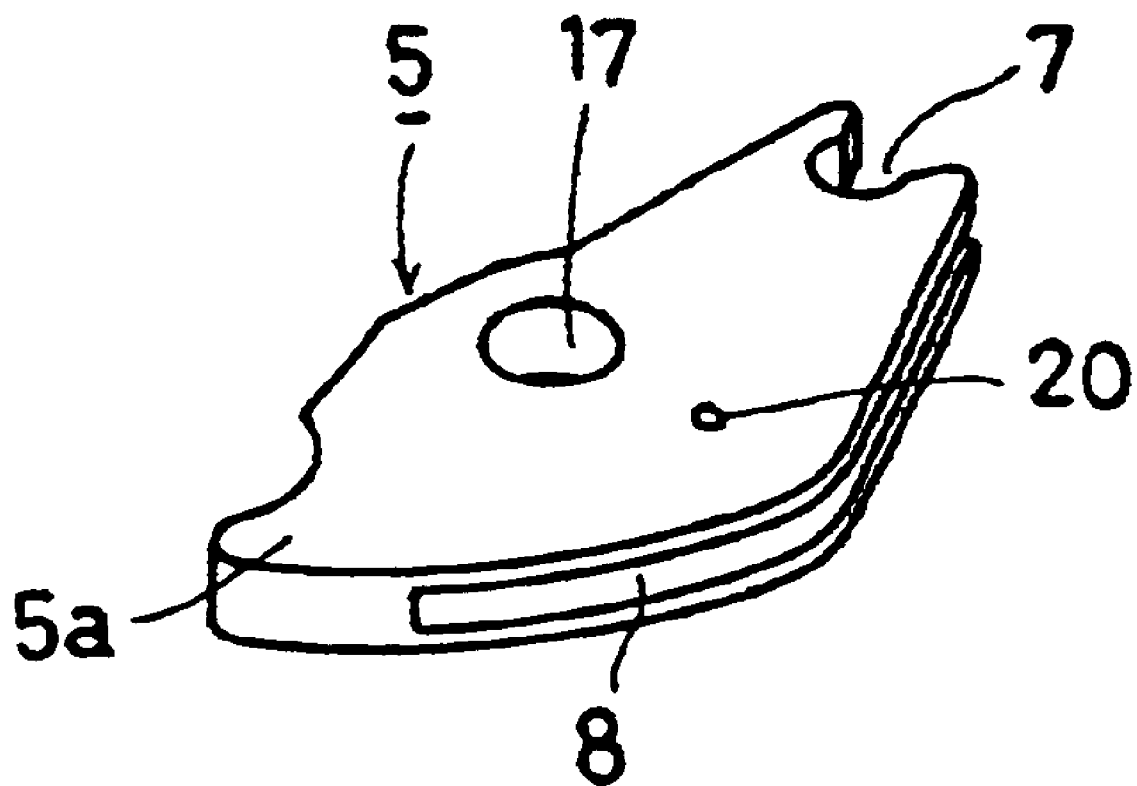
FIG. 10 is a perspective view of the control lever.
Figure 11A:
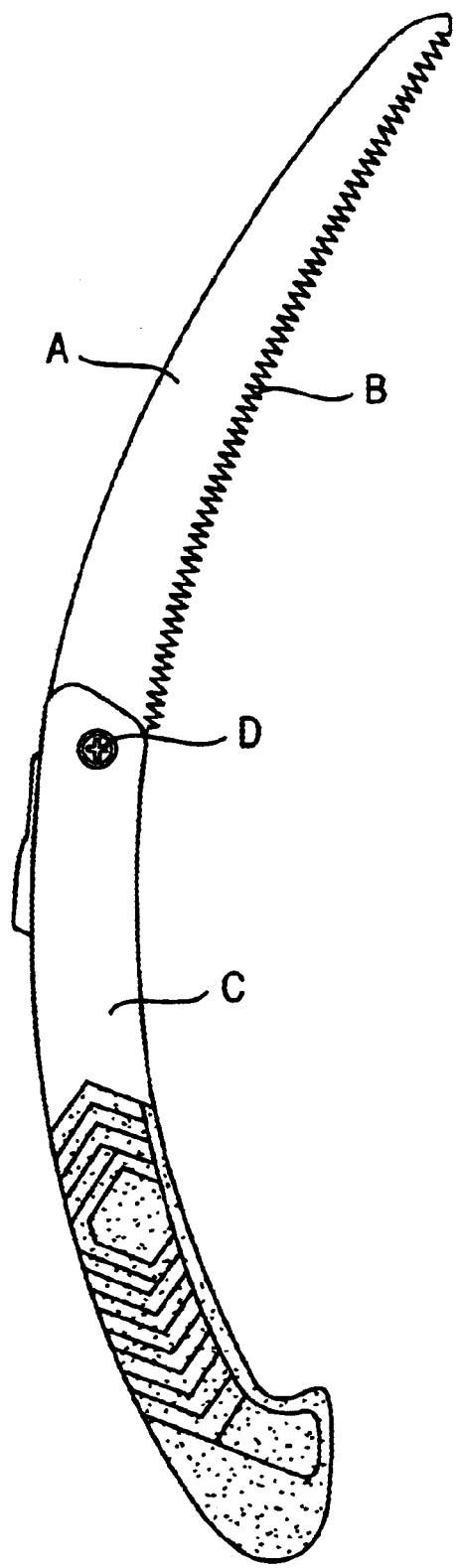
FIG. 11(a) is a front view of a conventional folding saw in the unfolded condition.
Figure 11B:
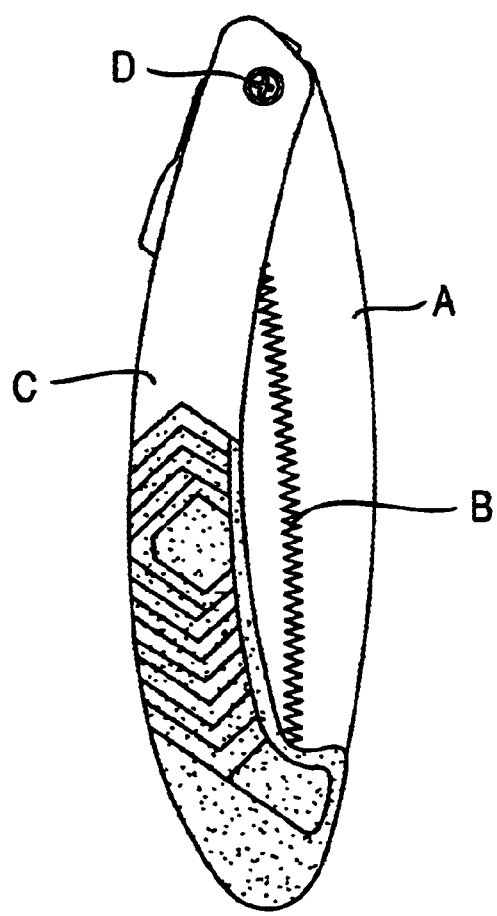
FIG. 11(b) is a front view of a conventional folding saw in the folded condition.

As shown in FIG. 10, the control lever 5 is provided with a concave groove 8 on the side on which the blade 1 is folded, so that when the blade 1 is folded, the top end of the blade goes into the concave groove 8. It is, of course, possible to use a blade 1 that does not reach the control lever 5 and not to form the concave groove 8. However, by allowing the top end of the blade to enter the concave groove 8 of the control lever 5, it is possible to use the portion where the control lever 5 is provided as an extension of the housing for the blade, therefore it is possible to house a long blade 1. In FIG. 10, numeral 17 refers to a throughhole for the pivot 6.

The folding saw described in the drawings operates as follows. When the blade 1 is pivoted around the top end of the handle 2 so that it is ready to cut, as shown in FIG. 1, the claw 15 of the stopper 12 provided at the top end of the handle 2 engages with the cut 10 formed at the base end of the blade 1. At this time, the resiliency of the spring 14 biasing the stopper 12 works to maintain the engagement, and the protective cover 4 arranged inside the housing groove 3 is pivoted by the control lever 5 into the housing groove 3 of the handle 2 so that it does not project out of the profile of the handle 2.

Figure 3:
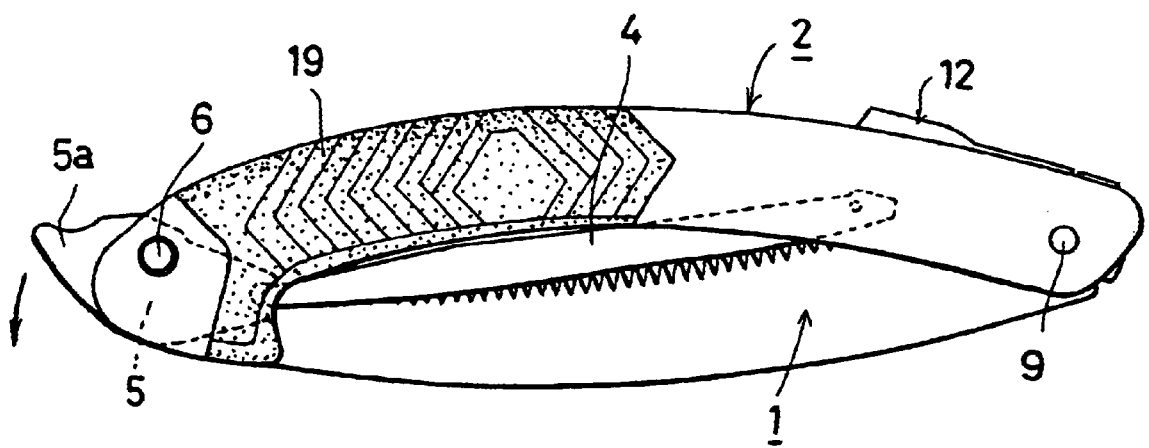
FIG. 3 is a side view in which the blade is folded and the protective cover is projected from the housing groove.
Figure 4:
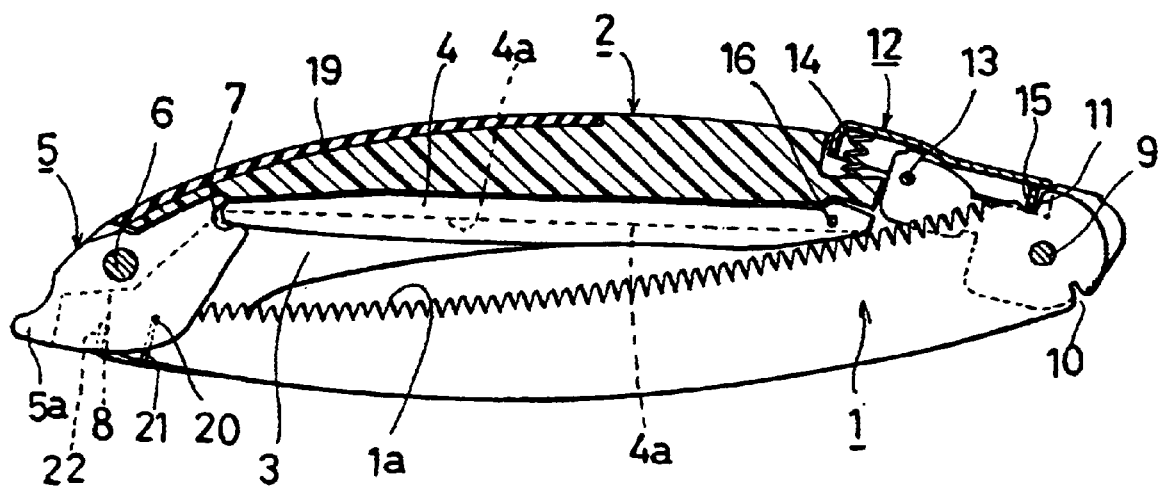
FIG. 4 is a longitudinal section view of the condition shown in FIG. 2.
Figure 5:
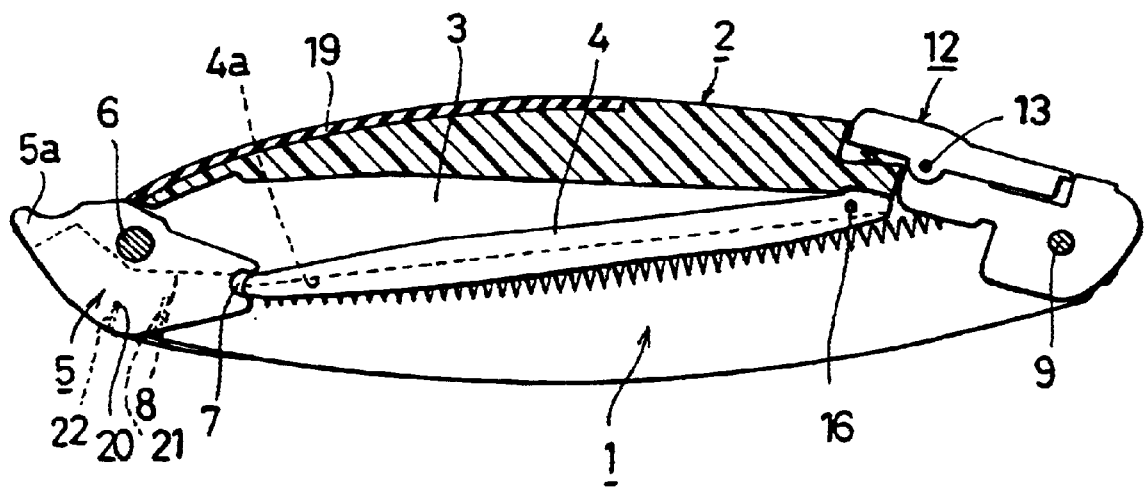
FIG. 5 is a longitudinal section view of the condition shown in FIG. 3.
Figure 6:
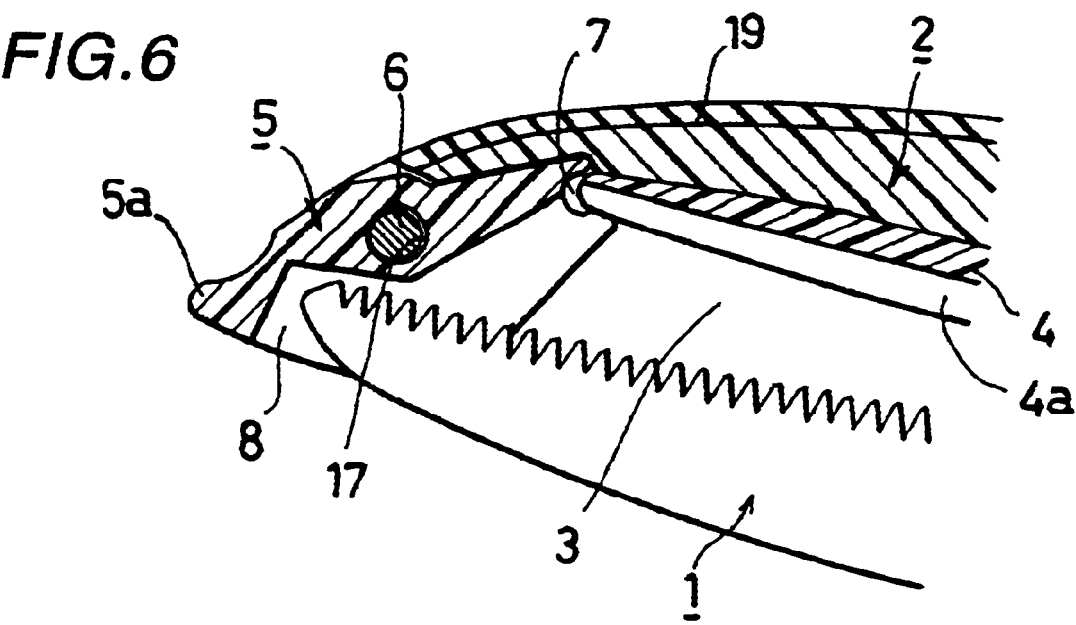
FIG. 6 is an enlarged section view of the bottom part of the handle in the condition shown in FIG. 2.
Figure 7:
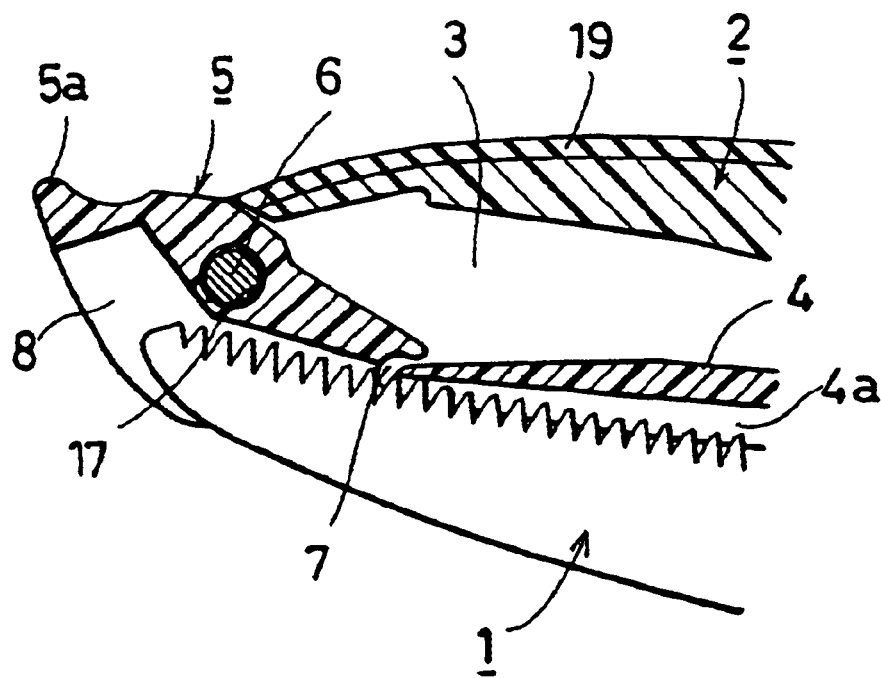
FIG. 7 is an enlarged section view of the bottom part of the handle in the condition shown in FIG. 3.

In order to maintain the control lever 5 at a certain position, for example, at the position shown in FIG. 1 at which the protective cover 4 is pivoted clockwise so as to remain inside the housing groove 3, or in the condition shown in FIG. 3 in which the protective cover 4 is pivoted counter-clockwise so as to project from the housing groove 3, a convex part is formed on either the surface of the control lever 5 or the inside of the housing groove 3 of the handle 2 and a concave part is formed on the other of the two, and the convex part and the concave part are meshed with each other. As an example, as shown in FIG. 10, a small projection 20 is formed on the side of the control lever 5, and two concave grooves 21, 22 are engraved inside the housing groove 3 of the handle 2. The concave groove 21 engages the small projection 20 at the position at which the protective cover is maintained inside the housing groove 3 as shown in FIG. 4. The concave groove 22 engages the small projection 20 at the position at which the protective cover 4 projects from the housing groove 3 as shown in FIG. 5. In this way, the control lever 5 can be maintained at a certain position. When the control lever 5 is operated with a little force, the small projection 20 is easily disengaged from the concave groove 21 or 22. The concave grooves 21, 22 may be formed as round concavities, but the same effect can be obtained easily by forming grooves that lead to the open end. This kind of mechanism is commonly known as a "click mechanism."

Figure 2:
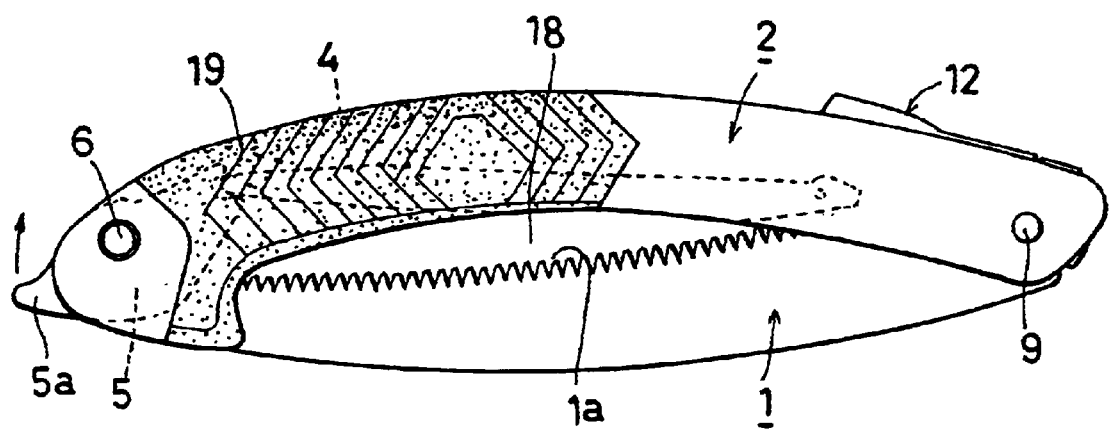
FIG. 2 is a side view in which the blade is folded and the protective cover is housed inside the housing groove.

From the condition shown in FIG. 1, the bottom end of the stopper 12 can be pressed to raise the claw 15 against the resiliency of the spring 14, thereby disengaging the stopper 12 from the cut 10. Then the blade 1 can be pivoted and folded as shown in FIGS. 2 to 5. When the blade 1 is pivoted and folded, the top end of the blade 1 goes into the concave groove 8 of the control lever 5 to the extent that the blade 1 cannot be pivoted any more, as shown in FIGS. 2 and 4. At this time, because the handle 2 and the blade 1 are both curved, a rather large gap 18 is formed between the handle 2 and the blade 1 as shown in FIGS. 2 and 4. In this condition, the edge 1a of the blade 1 is exposed, and it is dangerous to carry the saw in this condition.

In order to safely carry the saw with the blade 1 folded, the actuating part 5a of the control lever 5 that sticks out from the bottom end of the handle 2 in FIG. 2 is pivoted clockwise as viewed from this side. Then the protective cover 4 axially attached to the top end of the handle 2 via the pivot 16 revolves and appears from the housing groove of the handle 2 to the gap 18 as shown in FIG. 3. In this way, a portion of the blade 1, specifically the edge 1a, goes into the concave groove 4a of the protective cover 4 and is protected. The shape of the protective cover 4 and the depth of the concave groove 4a need not be such that the teeth of the blade 1 are completely covered. As long as the gap is deep enough so that the top ends of the teeth do not come into contact with the operator's fingers, the edge 1a of the blade 1 may be exposed partially without causing any problem.

When the blade 1 is unfolded and in a ready-to-cut condition, the operator grabs the handle 2 to use the saw. At this time, if the protective cover 4 remains projected from the housing groove of the handle 2, it is not easy for the operator to work. To lessen this inconvenience, when unfolding the blade 1, or when the blade 1 is unfolded and in the ready-to-cut condition, the operator can turn the actuator part 5a of the control lever 5 counter-clockwise, as indicated by an arrow in FIG. 3, and house the end of the protective cover inside the housing groove 3 of the handle 2. In this way, the protective cover 4 does not pose an obstacle when performing a cutting operation while grabbing the handle 2. The control lever 5 itself, which controls the movement of the protective cover 4, does not obstruct the cutting operation because it is positioned at the bottom end of the handle 2 and the actuating part 5a only extends from the periphery of the handle 2.

The protective cover 4, an end of which is axially supported by the pivot 16, engages with a portion of the control lever 5, which is pivotably attached via the pivot 6, so that the protective cover 4 can be operated by actuating the control lever 5. The engagement can be achieved in a variety of constructions. In the embodiment shown in the drawings, a round recess 7 is formed at one end of the control lever 5 and is loosely engaged with, and maintained by, the cooperating end of the protective cover 4, which is also formed round. In this way, the protective cover 4 and the control lever 5 can remain engaged, while their smooth operation is guaranteed. Specifically, by making the thickness of the protective cover 4 about the same as the thickness of the control lever 5, as well as the width of the housing groove 3 of the handle 2, such that the protective cover 4 is pivotal, the blade 1 does not move unnecessarily inside the housing groove 3.

The control lever 5 pivots about the pivot 6. At the other end of the control lever 5, i.e., on the open side of the housing groove 3 with reference to the pivot 6, a concave groove 8 into which the tip of the blade is inserted, is formed. Because the control lever 5 functions as a part of the handle of the folding saw, the handle 2 itself need not be unnecessarily long. Because the concave groove 8 of the control lever 5 is formed within the range of the thickness of the control lever 5, which is housed inside the housing groove 3, the width of the concave groove 8 is relatively narrow. This makes it possible to maintain the blade 1 inside the concave groove 8 in a stable condition with little play. The width of the concave groove 8 is preferably about the same as the width of the concave groove 4a of the protective cover 4.

In addition, in the embodiment shown in the drawings, the handle 2 itself is formed in one piece from a synthetic resin material and provided with non-slip rubber 19 that covers the part of the surface of the handle that is likely to be gripped by a hand, specifically the part that extends from the middle to the bottom end of the handle. The non-slip rubber 19 can be formed integrally with the handle 2 by inserting one into the other.

According to the folding saw of the invention described herein, in which either the edge of the blade, the handle, or both are curved in a concave shape, the edge part that is exposed from the housing groove of the handle when the blade is folded is covered by a protective cover. A folding saw equipped with such a protective cover is safe because the edge of the blade does injure the operator while being carried. In addition to protecting the operator, this folding saw has the effect of preventing the edge from accidentally coming into contact with and damaging other objects or, conversely, being damaged by such contact.

Moreover, the control lever for controlling the protective cover and the protective cover are firmly engaged with each other, avoiding the situation in which the folding saw cannot be operated or the control lever itself obstructs the cutting operation. Also, the blade can be folded to the part where the control lever is arranged, so the handle need not be extended in order to incorporate the control lever. By having the control lever hold the tip of the blade, the folded blade can be held firmly and stable.

What is claimed is:

1. A folding saw comprising a blade (1) having an edge (1a) and a handle (2), at least one of which being curved in a concave shape towards a side of the edge, and a base end of the blade (1) being pivotally attached to a top end of the handle (2) and having a semi-U-shaped cross section so that the blade (1) can be pivoted in such a way that at least a portion of the edge (1a) of the blade (1) is housed in a U-shaped housing groove (3) of the handle (2), said folding saw further including a protective cover (4) mounted for pivotal movement around the top end of the handle and being housed within the housing groove (3) of the handle (2) for housing the blade (1), a pivotable control lever (5) disposed at a bottom end of the handle (2) and having a portion engaged with the bottom end of the protective cover (4), said protective cover (4) being insertable into and extractable from the housing groove (3) of the handle (2) by pivoting the control lever (5), and when the blade (1) is folded, the protective cover (4) extending from the housing groove (3) of the handle (2) so as to cover the portion of the edge (1a) of the blade (1) that is exposed from the housing groove (3).

2. The folding saw described in claim 1, in which the control lever (5) is disposed at the bottom end of the handle (2) inside the housing groove (3) and is pivotally attached to the bottom of the handle via a pivot (6) perpendicularly disposed with respect to the plane of the blade (1), a portion of the protective cover (4) being held loosely in a recess (7) formed at one end of the control lever (5), and an actuator portion (5a) of the control lever (5) extending from the periphery of the handle.

3. The folding saw described in claim 2, in which a control lever (5) contains a concave groove (8) disposed at the bottom end of the handle (2) inside the housing groove (3), and the top end of the blade (1) being inserted into the concave groove (8) when folded.

* * * * *

UNITED STATES PATENT AND TRADEMARK OFFICE
CERTIFICATE OF CORRECTION

PATENT NO.    : 6,694,620 B2
DATED         : February 24, 2004
INVENTOR(S)   : Kanzawa, Kuniyuki It is certified that error appears in the above-identified patent and that said Letters Patent is hereby corrected as shown below:

<u>Title page,</u>
Insert Item, -- [30] Foreign Application Priority Data,
        March 22, 2001      (JP).................2001-082038 --

Signed and Sealed this

Twenty-second Day of June, 2004

JON W. DUDAS
*Acting Director of the United States Patent and Trademark Office*